United States Patent
Fan

(10) Patent No.: US 6,523,775 B2
(45) Date of Patent: Feb. 25, 2003

(54) CONVEYING APPARATUS

(75) Inventor: Jun-Ling Fan, Taoyuan (TW)

(73) Assignee: Chung Shan Institute of Science & Technology, Taoyuan (TW)

( * ) Notice: Subject to any disclaimer, the term of this patent is extended or adjusted under 35 U.S.C. 154(b) by 0 days.

(21) Appl. No.: 09/850,116

(22) Filed: May 8, 2001

(65) Prior Publication Data

US 2002/0074446 A1 Jun. 20, 2002

(51) Int. Cl.[7] .................. B65H 18/22; B65H 20/06; B65G 15/00
(52) U.S. Cl. ............... 242/530.2; 242/535.4; 242/541.3; 242/546; 198/804; 198/952
(58) Field of Search ............ 242/530.2, 535.4, 242/541.3, 528, 546, 909; 226/170; 198/952, 794, 804

(56) References Cited

U.S. PATENT DOCUMENTS

| 1,648,990 | A | * | 11/1927 | Little | 242/535.4 |
|---|---|---|---|---|---|
| 1,790,582 | A | * | 1/1931 | Graham et al. | 242/535.4 |
| 1,937,077 | A | * | 11/1933 | West | 242/546 |
| 2,309,045 | A | * | 1/1943 | Clayton | 242/535.4 |
| 2,407,692 | A | * | 9/1946 | Vickers | 198/794 |
| 2,681,702 | A | * | 6/1954 | Kuenn et al. | 242/530.2 |
| 3,024,887 | A | * | 3/1962 | Ingham | 198/794 |
| 3,807,893 | A | * | 4/1974 | Mott et al. | 415/121 G |
| 4,131,420 | A | * | 12/1978 | Miller | 198/952 |
| 4,265,410 | A | * | 5/1981 | Fanning | 242/530.2 |
| 4,334,651 | A | * | 6/1982 | McKinnon | 242/546 |
| 4,394,052 | A | * | 7/1983 | Adams et al. | 242/546 |
| 6,231,466 | B1 | * | 5/2001 | Thoma et al. | 475/83 |

FOREIGN PATENT DOCUMENTS

JP    11-269920    *  5/1999

* cited by examiner

Primary Examiner—John M. Jillions
(74) Attorney, Agent, or Firm—Bacon & Thomas, PLLC

(57) ABSTRACT

A conveying apparatus. The apparatus includes an air-cooled hydraulic driving unit, a hydraulic motor, a conveyor and a connecting element. The air-cooled hydraulic driving unit includes a hydraulic pump, an electrical motor, pipes, a flow regulator, and a cooling fan. The cooling fan is adapted for low temperature environment and does not require complicated pipes, so that the conveying apparatus of the present invention can be flexibly combined with other devices or applied to various processes.

9 Claims, 3 Drawing Sheets

CONVEYING APPARATUS

BACKGROUND OF THE INVENTION

1. Field of the Invention

The present invention relates to a conveying apparatus and, more particularly, to a conveying apparatus driven by an air-cooled hydraulic driving unit, such apparatus may further include a set of rollers used for collecting adhesive or rubber film in the processes of manufacturing adhesive tapes or tires.

2. Description of Related Art

Industrially, conveyors in processes are used to transport raw materials or products. For example, in the process of manufacturing rubber sheet, material is transported by a conveyor after being produced and cooled, and eventually collected by collecting rollers installed next to the conveyor. For most situations, the conveyor is often disposed in a fixed position to fit with the main production machine. The immobility of such conveyors is a shortcoming for the layout of such a plant.

Additionally, in order to improve the precision of transport speed, most conveyors are driven by hydraulic motors instead of electric motors. However, the oil of such hydraulic motors is mostly cooled by a liquid cooling medium, which needs a highly efficient cooling device to cool the liquid medium. In this way, such arrangement is apparently limiting the flexibility of the conveyors.

Therefore, it is desired to provide an improved conveying apparatus to mitigate and obviate the aforementioned problems.

SUMMARY OF THE INVENTION

The object of the present invention is to provide a conveying apparatus which can be easily moved and disengaged to be suitable for different production processes.

Another object of the present invention is to provide a conveying apparatus which is flexibly used in sheet material collection.

To achieve these objects, the conveying apparatus of the present invention includes an air-cooled hydraulic driving unit, a hydraulic motor, a conveyor and a connecting element.

The air-cooled hydraulic driving unit is composed of a hydraulic pump, an electrical motor, a plurality of pipes, a flow regulator, and a cooling fan. The flow regulator can be a manual-control valve or an electrical-control valve. The hydraulic motor can be driven by the hydraulic pump of the air-cooled hydraulic driving unit. The conveyor includes a main roller driven by the hydraulic motor, at least one passive roller, and a belt mounted around the main roller and the passive roller. The connecting element can be, for example, a coupling used for connecting the hydraulic motor and the main roller of the conveyor.

The air-cooled hydraulic driving unit may further include a manometer and a three-way valve to stop the hydraulic driving unit or to make the belt operate in the opposite direction.

The cooling fan and the electrical motor of the air-cooled hydraulic driving unit can simultaneously start up by connecting electrically in parallel, and the power is generally supplied with 3-phase AC of 220 V and 3.5 A.

The above apparatus may combine with at least one set of rollers disposed upon the belt to form a film products collector. The one set of rollers primarily includes a supplying scroll holding liner sheets, and at least one collecting scroll for rolling up the film product overlaid on the liner sheets. The supplying scroll can be regulated by a tension element, and the collecting scroll can be elevated by two supporting devices at two ends thereof.

Additionally, a tension roller may be disposed between the supplying scroll and collecting scroll to keep the liner sheets stretched taut. The film product is laid out over the conveyor belt by passing it in between a pressing roller and the conveyor belt after it is produced from a main production machine.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
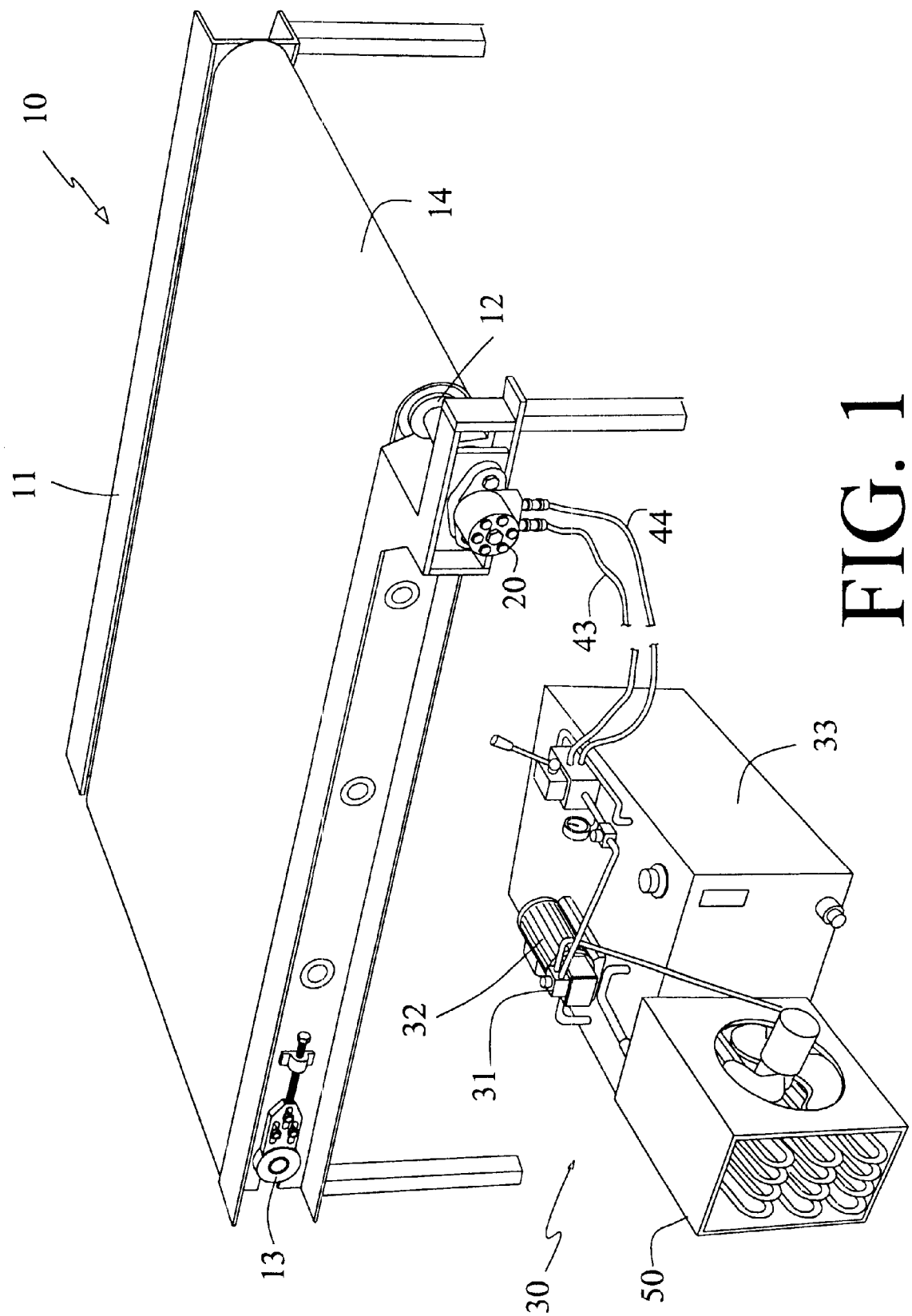
FIG. 1 is a perspective view of an embodiment the present invention.

With reference to FIG. 1, there is shown a perspective view of the conveying apparatus of the present invention, wherein a conveyor 10 includes a frame 11, and a main roller 12 and a passive roller 13 mounted on the frame 11. Around the main roller 12 and the passive roller 13, a belt 14 is mounted to transport objects thereon. The main roller 12 can be driven to roll by a hydraulic motor 20, and connects with each other by a coupling. The hydraulic motor 20 is driven by oil in pipes 43, 44 of a hydraulic driving unit 30.

Figure 2:
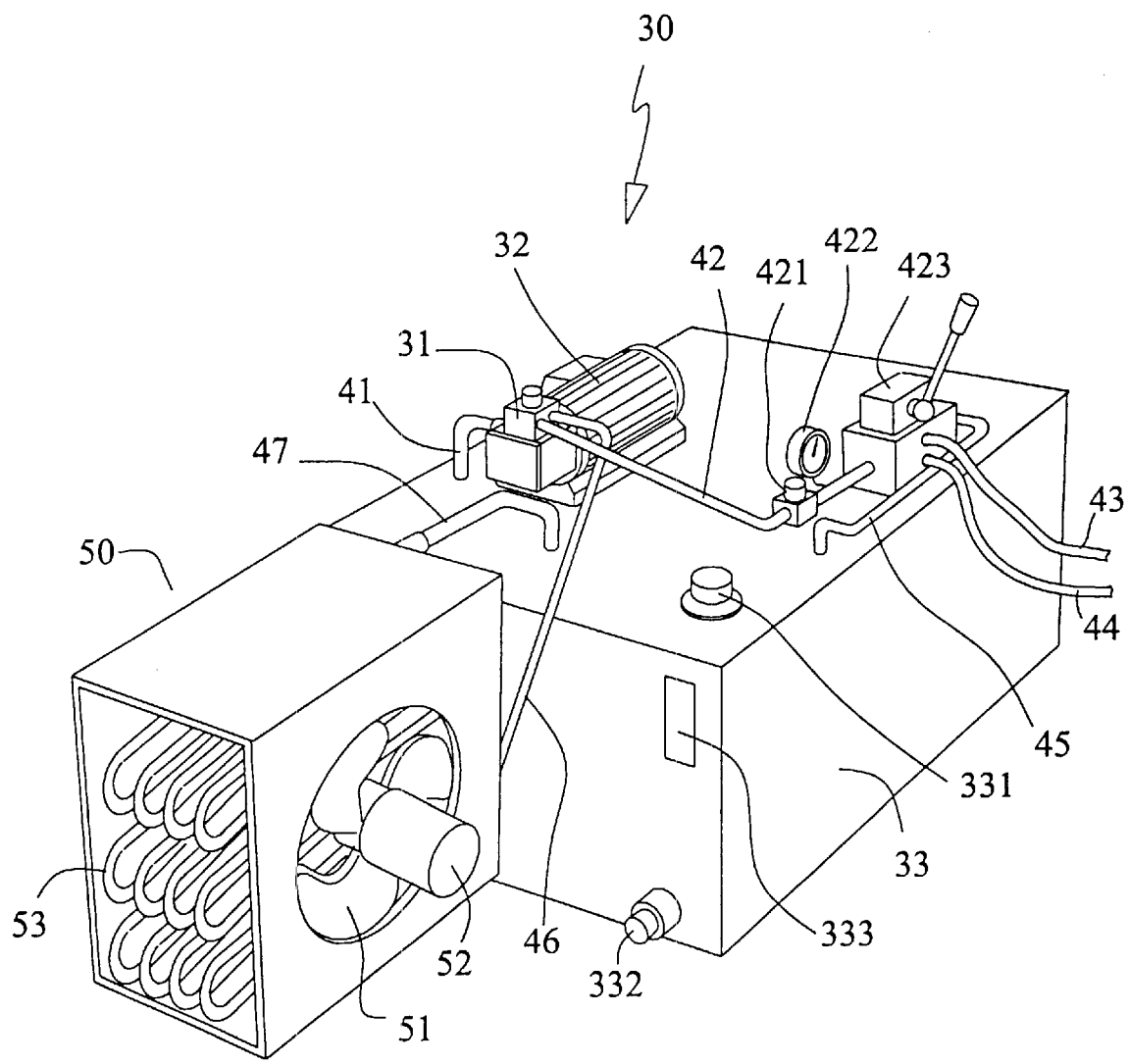
FIG. 2 is a perspective view of the driving unit of the embodiment in FIG. 1.

The hydraulic driving unit 30 is shown in FIG. 2, which includes a hydraulic pump 31, an electrical motor 32, an oil tank 33, and a cooling fan 50 for cooling the oil. The oil tank 33, with an inlet 331, a discharge-opening 332 and a window 333 to inspect the oil level, can store and supply oil to the hydraulic driving unit 30. The cooling fan 50 includes a set of blades 51, a driving motor 52 and a cooling circuit 53.

The oil drawn from the oil tank 33 enters into the hydraulic pump 31 through an oil pipe 41, and flows out through an oil pipe 42. A manual-control flow regulator 421 is installed on the oil pipe 42 to adjust the oil flow in the pipe 42 and therefore control the speed of the belt 14. An electrical-control valve can be used instead of the manual-control flow regulator 421. A manometer 422 for monitoring the oil pressure and a three-way valve 423 for changing the flowing direction of the oil are installed next to the flow regulator 421. The three-way valve 423 is operated by wrenching a handle up, down or to the middle position, so as to control the running direction of the belt 14, or make it stop running.

The oil from an oil pipe 43 enters into the hydraulic motor 20 shown in FIG. 1, and then flows back to the three-way valve 423 through an oil pipe 44. The circulating oil eventually flows back to the oil tank 33 through an oil pipe 45. In general, the temperature of the circulating oil may gradually rise to about 60–90° C. after a period of working time. Therefore, a part of the oil drawn from the hydraulic pump 31 is cooled by transporting to the cooling circuit 53 of the cooling fan 50 through an oil pipe 46. The cooled oil, at a temperature of about 26° C., is then sent back to the oil tank 33 through an oil pipe 47.

In this embodiment, the oil pipes 41, 42, 45, 46, and 47 are metal pipes, and oil pipes 43, 44 are high pressure rubber hoses. Additionally, the driving motor 52 of the cooling fan 50 and the electrical motor 32 are electrically connected in parallel to enable simultaneous start up, and the power is generally supplied by 3-phase AC of 220 V and 3.5 A.

Figure 3:
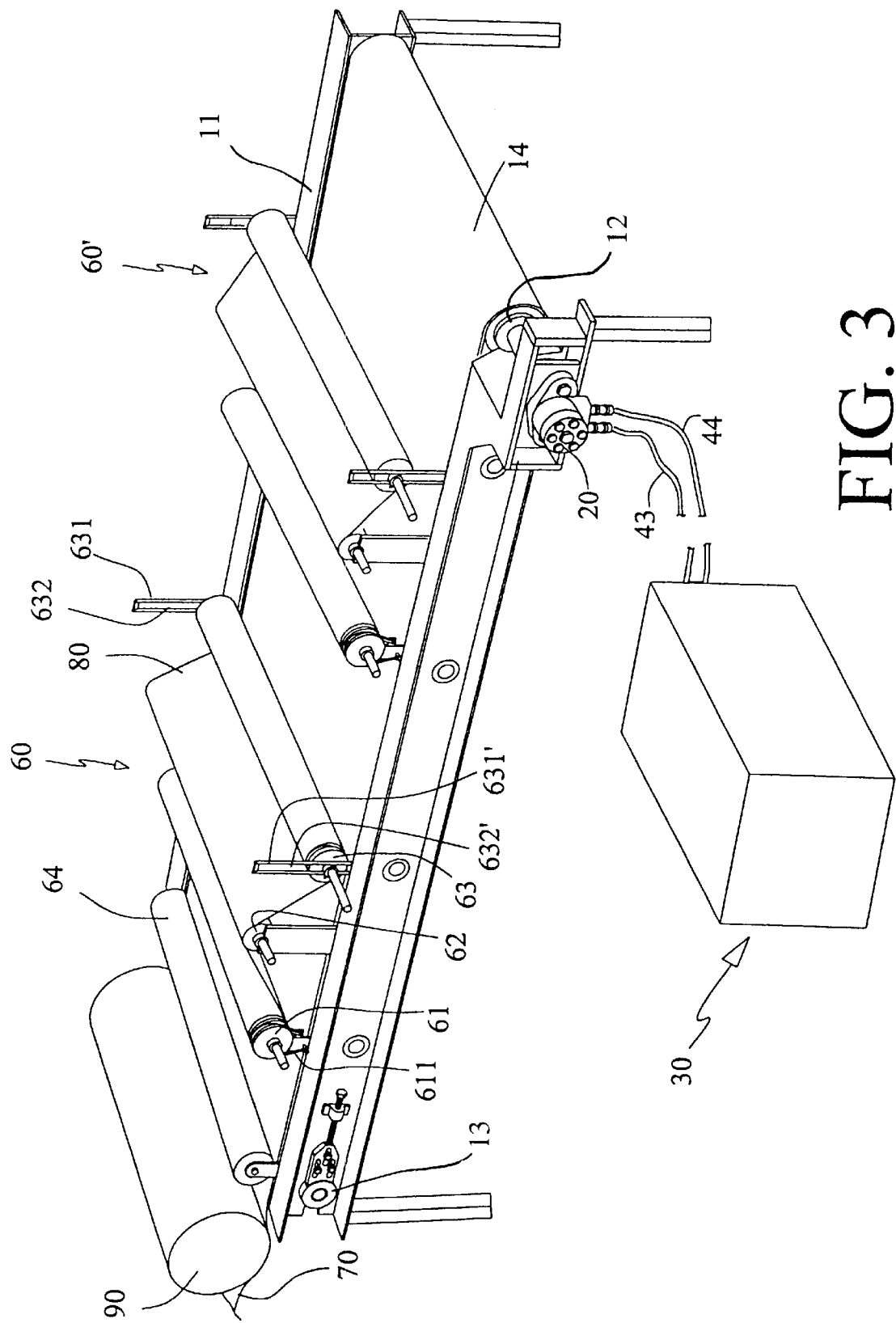
FIG. 3 is a perspective view of another embodiment of the present invention.

FIG. 3 is a view of combining the above apparatus with two sets of rollers 60, 60' disposed upon the conveying belt 14 to form a film product collector, which is suitable for processes of, for example, collecting rubber sheets or textile products, etc.

One set of the rollers 60, for example, primarily includes a supplying scroll 61 rolling up liner sheets 80, and a collecting scroll 63 for collecting and rolling up the film product 70 overlaid on the liner sheet 80. The supplying scroll 60 can be stopped by a tension element 611, and the collecting scroll 63 can be supported by two regulating rods 631, 631' at two ends thereof. The two regulating rods 631, 631' have respective slots 632, 632', enabling the collecting scroll 63 to slide up and down within the slots 632, 632' and fixed therein. Additionally, a tension roller 62 may be disposed between the supplying scroll 61 and the collecting scroll 63 for keeping the liner sheets 80 stretched taut. The film product 70 can become horizontally flat and line on the conveying belt 14 by pressing it between a pressing roller 64 and the belt 14.

After being produced and then continually transported through the cooling roller 90, the film product 70 is pressed by the pressing roller 64 to lie the film 70 on the belt 14. The plastic liner sheet 80 around the supplying scroll 61 is kept in tension by the tension roller 62, and rolled around the collecting scroll 63. After being sent underneath the pressing roller 64, the film product 70 is overlaid and rolls together with the liner sheet 80 on the collecting scroll 63 which was put down into contact with the conveying belt 14 by moving along the two slots of the two supporting devices 631, 631'. On the other hand, the collecting scroll 63 can freely slide up along the two slots, when the size of the roll of the film product 70 together with the liner sheet 80 is increased. In this way, the film product 70 covered with the liner sheet 80 is collected around the collecting scroll 63.

For most batchwise processes such as the one described above, the conveying apparatuses often lie idle when the production line stops working, if they can't be easily moved. However, the conveying apparatus of. the present invention can overcome such problem by cooling the oil with the cooling fan 50, because no complicated piping for transporting cooling liquid and its heavy weight coding tank are required. It's understandable that the effect of cooling air is unsurpassed to use the conveying apparatus of the present invention in low-temperature environment, or connect with a small-sized conveyor for being easily moved.

Furthermore, the conveying apparatus 10 can be adapted to other devices or rollers to promote or increase its working capability such as the aforementioned film product collector.

Although the present invention has been explained in relation to its preferred embodiment, it is to be understood that many other possible modifications and variations can be made without departing from the spirit and scope of the invention as hereinafter claimed.

What is claimed is:

1. An apparatus for collecting film product, comprising:

an air-cooled hydraulic driving unit comprising a hydraulic pump, an electrical motor, a plurality of pipes, a flow regulator, and a cooling fan driven by a driving motor;

a hydraulic motor driven by said hydraulic pump of said air-cooled hydraulic driving unit;

a conveyor comprising a frame body, a main roller being driven by said hydraulic motor, at least one passive roller, and a belt mounted around said main roller and said passive roller;

a connecting element for connecting said hydraulic motor and said main roller of said conveyor; and at least one set of rollers being disposed upon said belt, comprising a supplying scroll with liner sheet, and at least one collecting scroll.

2. The apparatus as claimed in claim 1, wherein said flow regulator of said air-cooled hydraulic driving unit is a manual-control valve.

3. The apparatus as claimed in claim 1, wherein said air-cooled hydraulic driving unit further comprises a three-way valve that enables said belt to run in the opposite direction, or make it stop running.

4. The apparatus as claimed in claim 1, wherein said air-cooled hydraulic driving unit further comprises a manometer.

5. The apparatus as claimed in claim 1, wherein said driving motor of said cooling fan and said electrical motor of said air-cooled hydraulic driving unit are connected electrically in parallel.

6. The apparatus as claimed in claim 1, wherein said connecting element is a coupling.

7. The apparatus as claimed in claim 1, wherein said set of rollers further comprises a tension roller disposed between said supplying scroll and said collecting scroll.

8. The apparatus as claimed in claim 1, wherein said collecting scroll is supported by two regulating rods at two ends thereof, said two regulating rods having respectively slots enabling said collecting scroll to slide up and down within said slots and fix therein.

9. The apparatus as claimed in claim 1, wherein said supplying scroll is adapted to be regulated by a tension element.

* * * * *